(12) United States Patent
Zheng (10) Patent No.: US 9,429,707 B2
(45) Date of Patent: Aug. 30, 2016

(54) MAKING FIBER AXICON TAPERS FOR FUSION SPLICERS

(71) Applicant: AFL Telecommunications LLC, Duncan, SC (US)

(72) Inventor: Wenxin Zheng, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/443,824

(22) PCT Filed: Aug. 26, 2014

(86) PCT No.: PCT/US2014/052665
§ 371 (c)(1),
(2) Date: May 19, 2015

(87) PCT Pub. No.: WO2015/031333
PCT Pub. Date: Mar. 5, 2015

(65) Prior Publication Data
US 2015/0286000 A1    Oct. 8, 2015

Related U.S. Application Data (60) Provisional application No. 61/870,001, filed on Aug. 26, 2013.

(51) Int. Cl.
| | |
|---|---|
| *G02B 6/38* | (2006.01) |
| *G02B 6/255* | (2006.01) |
| *G02B 27/09* | (2006.01) |
| *G02B 6/26* | (2006.01) |

(52) U.S. Cl.
CPC ............. *G02B 6/255* (2013.01); *G02B 6/2552* (2013.01); *G02B 6/2553* (2013.01); *G02B 6/262* (2013.01); *G02B 27/0955* (2013.01)

(58) Field of Classification Search
CPC .......... G02B 6/255; G02B 6/38; G02B 6/04
USPC ......................................... 65/377
See application file for complete search history.

(56) References Cited

U.S. PATENT DOCUMENTS

| | | | |
|---|---|---|---|
| 2003/0000256 A1* | 1/2003 | Ukrainczyk | ......... G02B 6/2551 65/404 |
| 2005/0173817 A1 | 8/2005 | Fauver et al. | |
| 2009/0304340 A1 | 12/2009 | Taghizadeh et al. | |
| 2013/0205835 A1 | 8/2013 | Giaretta et al. | |

OTHER PUBLICATIONS

Wang et al.,"High-Q Bismuth-Silicate Nonliner Glass Microsphere Resonators", IEEE Photonics Journal, Jun. 2012, pp. 1013-1020.*
Wang et al., "review of Fabrication Techniques for Fused Fiber Components for Fiber Lasers", SPIE Photonic West'09, Fiber Lasers VI: Technology Systems and Applications, 2009, 11 pages.*
International Search Report for PCT/US2014/052665 dated Dec. 9, 2014.
Written Opinion for PCT/US2014/052665 dated Dec. 9, 2014.

* cited by examiner

*Primary Examiner* — Mark Halpern
(74) *Attorney, Agent, or Firm* — Dorty & Manning, P.A.

(57) ABSTRACT

A method of manufacturing a fiber axicon taper includes, aligning a fiber, splicing the fiber, pulling the fiber, necking the fiber, breaking the fiber, and rounding the edges of the fiber axicon taper.

1 Claim, 9 Drawing Sheets

Pull to create a taper

Feed to create ball lens

Use ball lens to heat the axicon

| Axicon performance | Sample (from OZ Optics) by CO2 laser shaping method | Sample by fusion with arc discharge using Fujikura FSM-100 | Sample by fusion with CO2 laser using AFL LZM-100 |
|---|---|---|---|
| Typical Samples |  |  |  |
| Ellipticity: spec < 1.2 | Ellipticity = 1.03 | Ellipticity = 1.06 | Ellipticity = 1.02 |
| Spot size: 2.5 um ±10% | Spot size = 2.37 um | Spot size = 2.31 um | Spot size = 2.54 um |
| Typical beam shapes |  |  |  |

FIG. 9

MAKING FIBER AXICON TAPERS FOR FUSION SPLICERS

CROSS-REFERENCE TO RELATED APPLICATIONS

This application is a 371 of PCT/US14/52665 filed 26 Aug. 2014.

This application is based upon and claims the benefit of priority from U.S. Provisional Application No. 61/870,001, filed Aug. 26, 2013 in the United States Patent and Trademark Office, the disclosures of which are incorporated herein in its entirety by reference.

BACKGROUND

1. Field

The invention is related to methods for making fiber axicon tapers with fusion splicers, and more particularly to making fiber axicon with arc fusion splicer and making axicon with CO2 laser fiber processor.

2. Related Art

The increasing demands of semiconductor lasers and optoelectronic devices require an increasingly larger number of fiber lenses for coupling fibers to the electronic chips and circuits. Among many different fiber lens designs, such as ball shaped, wedge shaped, etc., the axicon shaped fiber lens is still the most widely used design in optoelectronic devices.

Currently, the axicon fiber lens is mainly manufactured using two methods, polishing and laser shaping. With the polishing method, the minimum spot size that can be achieved without introducing significant aberrations is 3.5 micron, which is not small enough to efficiently couple to a large number of laser types and optoelectronic devices. Though the laser shaping method can reach as low as 2 micron spot size, the Gaussian distributed intensity of laser beams cannot easily achieve good centration with the fiber cladding. Thus, the laser shaping method is not ideal for V-grove arrays, where a precise spacing between adjacent tapers is essential.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a method of manufacturing a fiber axicon taper includes aligning a fiber, splicing the fiber, pulling the fiber, necking the fiber, breaking the fiber, and rounding edges of the fiber axicon taper.

According to another exemplary embodiment, the method further includes measuring the tapered neck of the fiber prior to the breaking of the fiber.

According to an aspect of another exemplary embodiment, a method of manufacturing a fiber axicon taper includes pulling a fiber to create a tapered neck, feeding the tapered neck to create a ball lens, and using the ball lens to heat a tip of the fiber axicon taper.

According to an aspect of another exemplary embodiment, a non-transitory computer readable recording medium storing a program used in an apparatus, including at least one processor, for manufacturing a fiber axicon taper, causes the at least one processor to align a fiber, splice the fiber, pull the fiber, neck the fiber, break the fiber; and round edges of the fiber axicon taper.

According to another exemplary embodiment, the program further causes the at least one processor to measure the tapered neck of the fiber prior to the breaking of the fiber.

According to an aspect of another exemplary embodiment, a non-transitory computer readable recording medium storing a program used in an apparatus, including at least one processor, for manufacturing a fiber axicon taper, causes said at least one processor to pull a fiber to create a tapered neck, feed the tapered neck to create a ball lens, and use the ball lens to heat a tip of the fiber axicon taper.

BRIEF DESCRIPTION OF THE DRAWING

FIGS. 1 (A) and 1(B) represent prior art of manufacturing axicon lens by polishing and laser shaping, according to an exemplary embodiment.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Applications of axicon tapers include, but are not limited to, connecting optical fiber to active components (laser chip, etc.), connecting optical fiber to Dense Wavelength Division Multiplexer (DWDM) devices, connecting optical fiber to waveguide packaging, connecting optical fiber to Microelectromechanical systems (MEMS) device connections, connecting optical fiber to miniaturized fiber optic components, and coupling fiber to circular or elliptical laser beam outputs.

Figure 1A:
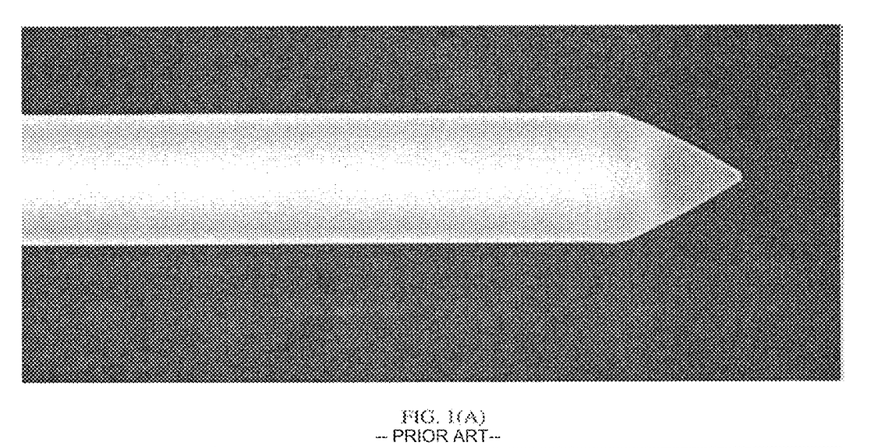
Figure 1B:
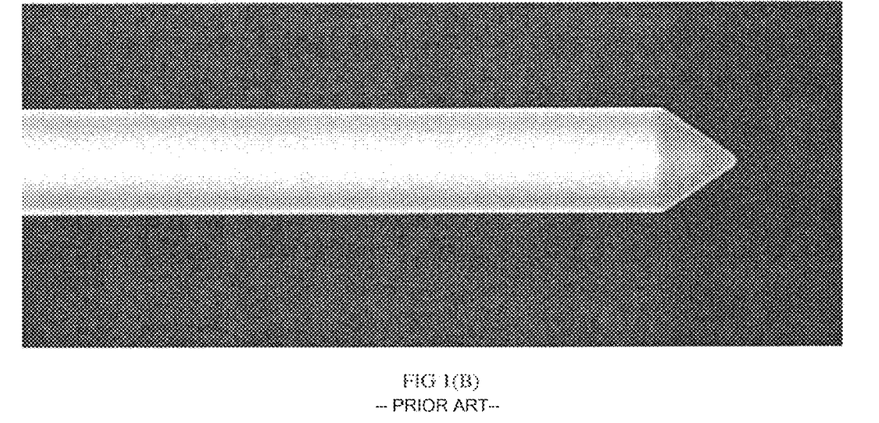

FIGS. 1 (A) and 1(B) represent prior art of manufacturing axicon lens by polishing and laser shaping, according to an exemplary embodiment.

Specifically FIG. 1(A) illustrates an axicon lens manufactures using polishing. FIG. 1(B) illustrates an axicon lens using laser shaping. With the fiber shaping method, the fiber shape is changed by polishing, chemical etching, or CO2 laser cutting with a highly focused beam. During the shaping process, the fiber is not heated and the internal fiber structure, such as the core size, refractive index profile, dopant material concentration, etc., is in general not changed.

Figure 2A:
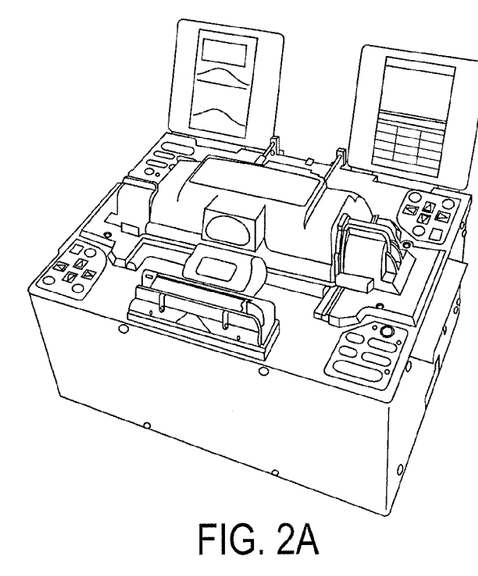
FIG. 2(A) illustrates an exemplary embodiment of an arc fusion splicer and FIG. 2(B) illustrates an exemplary embodiment of a CO2 laser fusion splicer.
Figure 2B:
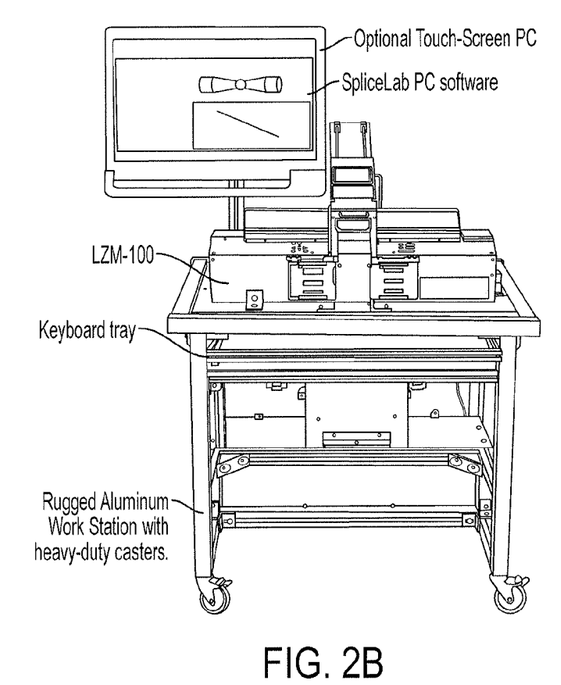

FIGS. 2(A) and 2(B) illustrate exemplary embodiments of fusion splicers. Specifically, FIG. 2 (A) shows an arc discharge fusion splicer FSM-100P which comprises features such as Split v-groove" clamping, variable plasma zone, 60 µm to 500 µm, ball lensing, tapering, IPA polarization maintaining (PM) align, PM fiber learning, zero degree fiber holder, and special arc calibration. Although a single example of a splicer is provided in FIG. 2 (A), one of ordinary skill in the art would know that several different kinds of splicers may be user. FIG. 2 (B) shows a CO2 laser fusion splicer LZM-100, which inheres all functions of FSM-100P with extremely large heating zone to process fibers from 10 µm to 2300 µm. Moreover, since these are no metal heating elements in the machine, it is almost maintenance free in operation.

Figure 3:
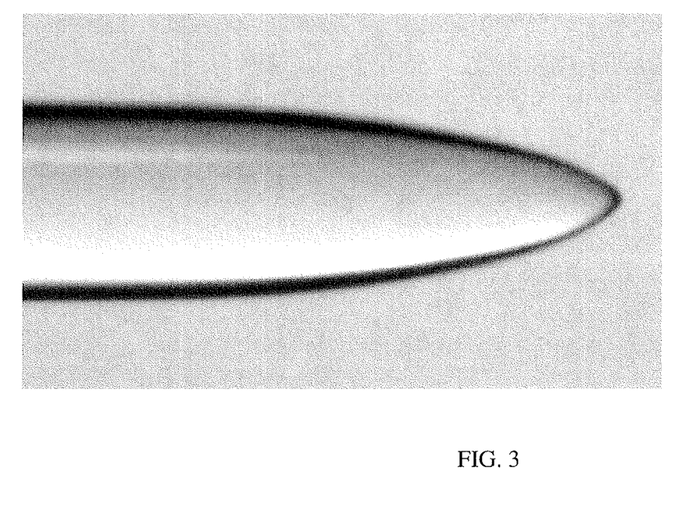
FIG. 3 illustrates an axicon lens manufactured using fusion, according to an exemplary embodiment.

FIG. 3 illustrates an axicon lens manufactured using fusion technique, according to an exemplary embodiment. Fusion technique incorporates methods of manufacturing fiber lenses using arc or CO2 laser fusion technology. Using this method, any spot size from 2 micron to 10 micron can be achieved with single mode or polarization maintaining fibers using a fully automated process that yields very good consistency, according to an exemplary embodiment.

With the fiber fusion method, the fiber is heated to a soft or liquid state by a heating source such as an arc discharge, a flame, filaments, or lower intensity CO2 laser beams. Thus, both the physical shape and parts of the inner structure of the fiber are changed to a certain degree. By implementing a controlled process, users can explore more freedom to modify the fiber shape and/or the inner structure. CO2 laser beam can be used for either fiber shaping or fiber fusion. For fiber shaping, a highly focused beam has to be used to evaporate the glass, while for fiber fusion, a beam with low intensity is required to merely soften, not evaporate, the glass.

With the fiber fusion method, the fiber tip can be formed easily into any desired tip angle. However, due to the high temperature heating, the fiber cladding may not retain the sharp corner of conical shapes as shown in FIG. 3. The core diameter may also be reduced proportionally with the cladding diameter. For keeping the optical property of the fiber, the deformed region should be as short as possible, according to an exemplary embodiment. Among the many heating methods, arc discharge with 1 mm (or less) electrode distance and a CO2 laser beam with a cylindrical lens can provide a heating region less than 0.8 mm along the fiber, according to an exemplary embodiment.

The manufacturing processes under the fusion technique are discussed in greater detail with reference to FIG. 5, FIG. 6, and FIG. 8.

Figure 4A:
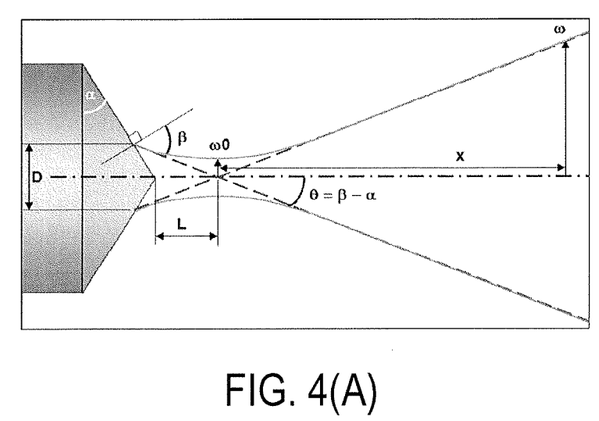
FIGS. 4(A) and 4(B) depict theoretical fiber axicon lens geometry and properties assuming uniform refractive index 1.5 for fiber glass, according to an exemplary embodiment.
Figure 4B:
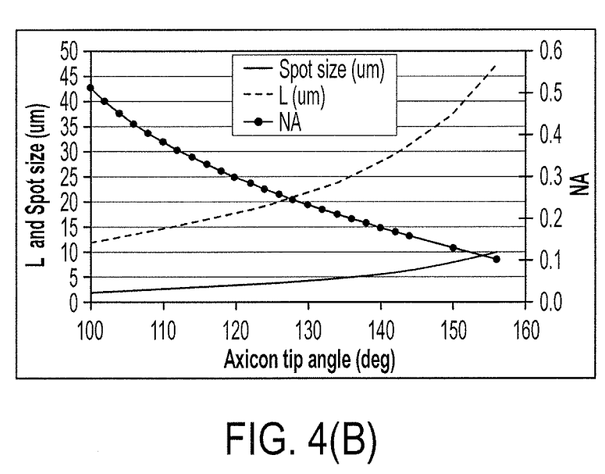

FIGS. 4(A) and 4(B) depict theoretical fiber axicon lens geometry and properties assuming uniform refractive index 1.5 for fiber glass, according to an exemplary embodiment. Because the axicon fiber micro lens is diffraction-free at the waist, it provides a convenient way to improve coupling between optical fibers and waveguide devices, laser diodes, or photo diodes. For a single mode fiber (SMF) with mode field diameter, D, the Gaussian beam is converted to a Bessel-Gaussian beam. Studied with the Fresnel diffraction integral, the relation between the axicon tip angle ($\phi=180-2\times\alpha$) and the numerical aperture (NA), spot size ($2\times\omega_0$), and focus length (L) can be expressed by the charts illustrated in FIG. 4(A) and FIG. 4(B).

FIGS. 5(A)-5(H) illustrate processing steps for creating an axicon fiber lens using a splicer with the arc discharge method, according to an exemplary embodiment.

Figure 5:
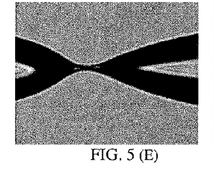
FIGS. 5(A)-5(H) illustrate processing steps for creating an axicon fiber lens using a splicer with the arc discharge method, according to an exemplary embodiment.

As an exemplary embodiment, a commercially available PM splicer, Fujikura's FSM-100P, may be used. A Splicer such as Fujikura's FSM-100P is optimal because of its narrow heating width (0.6 mm), the programmable electrode gap, fully user programmable multi-step special functions, and its two rotators for unlimited spin during heating to prevent the fiber tip bending due to gravity. A fused axicon may be manufactured either with a single intact fiber, or two cleaved and subsequently spliced fibers. With the single fiber, it is required that the fiber be window-stripped and the left and right side v-grooves on the splicing machine be properly aligned, which may be time consuming. On the other hand, with two pieces of cleaved fiber, the process is more efficient, since the v-groove and fiber tension are automatically aligned by splicing. The fully automated process may take about 60 seconds in one continuous run. FIGS. 5(B)-5(D) are hot fiber images during the heating process.

Figure 5A:
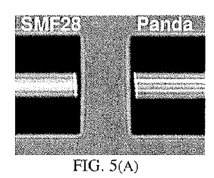
Figure 5B:
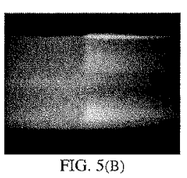
Figure 5C:
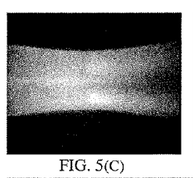
Figure 5D:
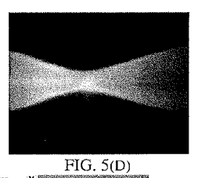
Figure 5F:
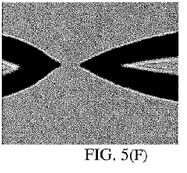
Figure 5G:
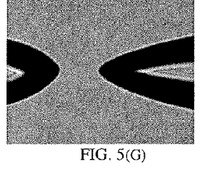
Figure 5H:
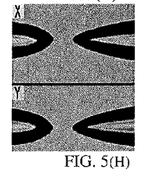

The process starts with a PANDA fiber being aligned as shown in FIG. 5(A) followed by it being spliced to a single mode fiber in preparation for making a polarization maintaining lens as shown in FIG. 5(B). After pulling to taper and break the fibers apart as depicted in FIGS. 5(C)-5(F), the fibers are rotated during heating to keep the lens tip in the same axis with the fiber. The pulling and breaking apart step is depicted in 4 different steps in FIG. 5. FIG. 5(C) illustrates pulling, FIG. 5(D) depicts the necking of the fiber, FIG. 5(E) illustrates measurement right before the breaking which is shown in FIG. 5(F). The edges are then rounded as shown in FIG. 5(G) and the final axicon is depicted in FIG. 5(H). The beam quality may be measured at the end of the process again. The arc discharge method can create a good quality fiber lens when the electrodes are in good condition. However, note that the fusion time required for axicon lens generation may be about 20 times longer than a typical fiber splicing process, and the fusion power may also be higher than normal splicing power. Thus, the electrodes may become contaminated quicker, the electrode tips may degrade, and electrode life may significantly be shorter. Every time the electrodes are cleaned or replaced, the electrodes may need to be stabilized and the arc power may need to be recalibrated. For the requirement of consistency in axicon production operations, a more stable heat source may be required.

FIGS. 6(A)-6(D) illustrate processing steps for creating axicon lens using a fully automated splicer with CO2 laser beam for heating, according to an exemplary embodiment.

As an exemplary embodiment, a commercially available CO2 laser splicer, AFL's LZM-100, may be used. It has similar features, hardware, and software to the arc discharge splicer discussed in the above exemplary embodiment.

Figure 6A:
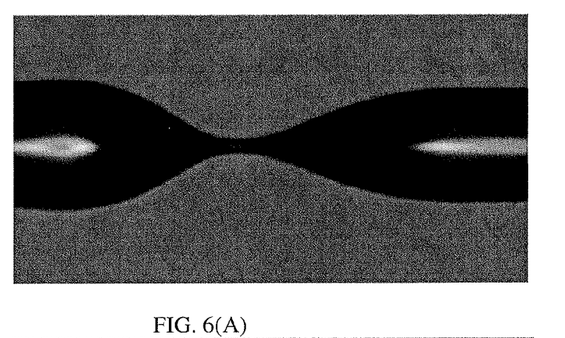
FIGS. 6(A)-6(D) illustrate processing steps for creating axicon lens using a fully automated splicer with CO2 laser beam for heating, according to an exemplary embodiment.
Figure 6B:
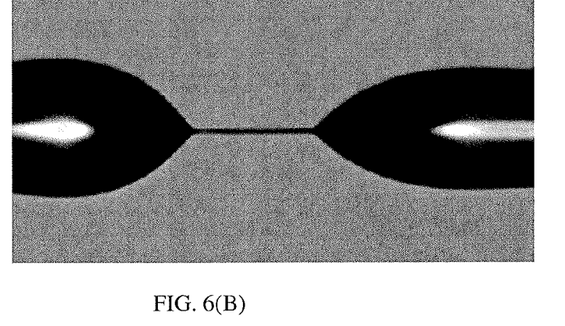
Figure 6C:
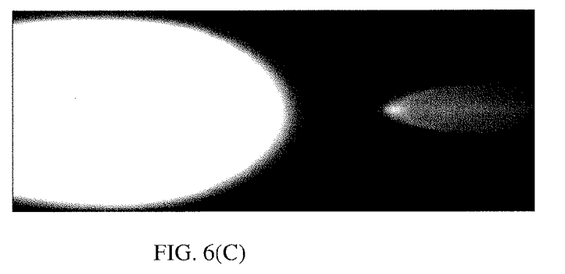
Figure 6D:
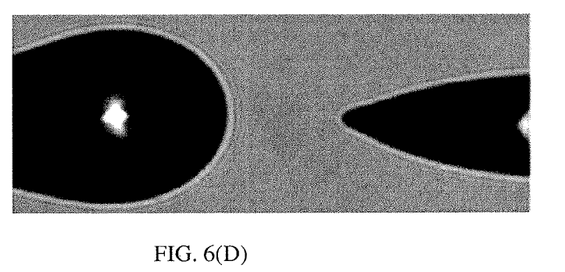

Compared to the 2 hour total life span of electrodes, the 20,000 hour rated operation time of a CO2 laser ensures significantly reduced maintenance. However, the difference in the heating method may lead to large differences in the lens process. With arc discharge, the fiber is heated by plasma radiation, while with a CO2 laser, the glass is heated by beam energy absorption at the 10.6 um wavelength, according to an exemplary embodiment. A thick fiber may absorb more energy due to its large surface area, but a very small diameter fiber may not even melt because of its small absorption area. This is a very valuable property for splicing a large diameter end-cap to a small fiber, but it may cause an issue when trying to break a fiber by tapering. A glass thread may be formed between the tapers with relatively high strength, as shown in FIG. 6(B). This may degrade the beam quality. Thus, with CO2 heating, after the step shown in FIG. 5(E) and FIG. 6(A), the left fiber needs to be pushed into the beam and to form a ball as shown in FIG. 6(C). Heat radiation from the ball then smoothens the tip of the right-side fiber to form an axicon lens with the desired shape as shown in FIG. 6(D). During this process, fiber rotation may also be necessary to negate the effects of gravity, according to an exemplary embodiment.

Figure 7:
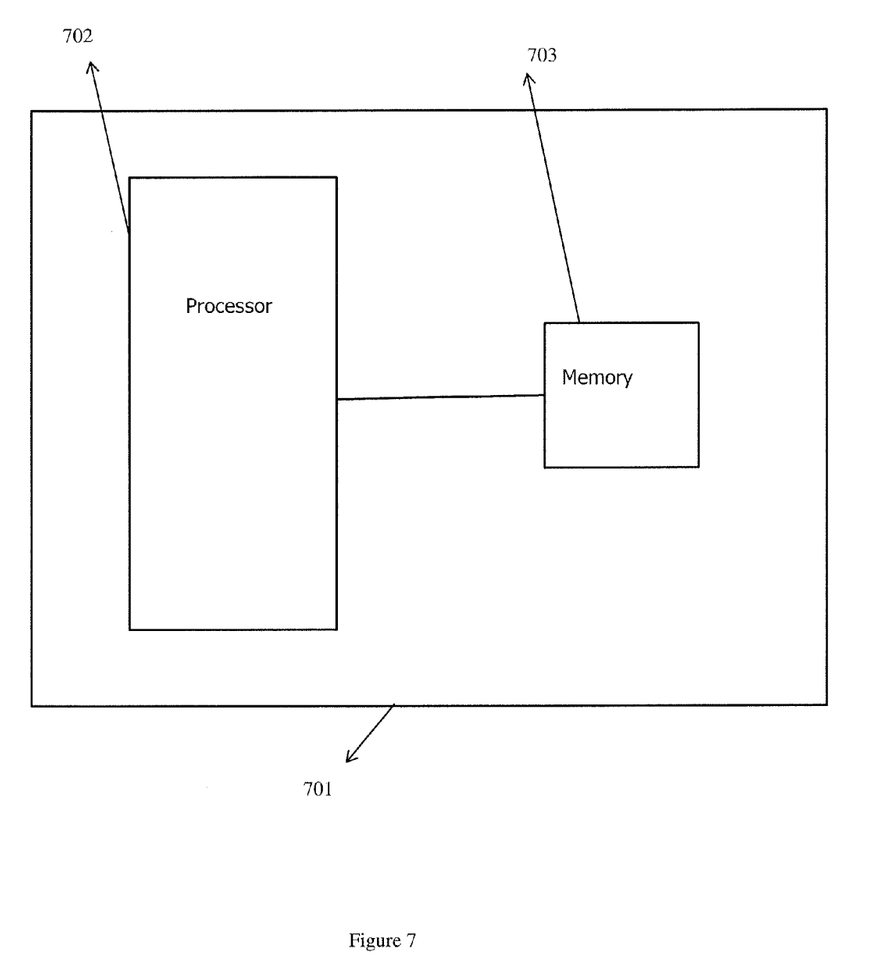
FIG. 7 illustrates a functional block diagram of an embodiment of an apparatus comprising a processor which performs the processing steps illustrated in FIG. 5 and/or FIG. 6.

FIG. 7 illustrates a functional block diagram of an embodiment of an apparatus comprising a processor which performs the processing steps illustrated in FIG. 5 and/or FIG. 6.

A non-transitory computer readable recording medium storing a program may be used in an apparatus 701. The apparatus includes a memory 703 and a processor 702, according to an exemplary embodiment. An example of a processor is an ARM Xscale 806 Mhz processor. An example of a memory is an 8 Gbit NAND flash memory. The memory may store a program code/operating software which in-turn instructs the processor 702 to perform the process steps as described in FIGS. 5(A)-5(H) and/or 6(A)-6(D). The program code/operating software may also be stored on a non-transitory computer readable medium.

Figure 8:
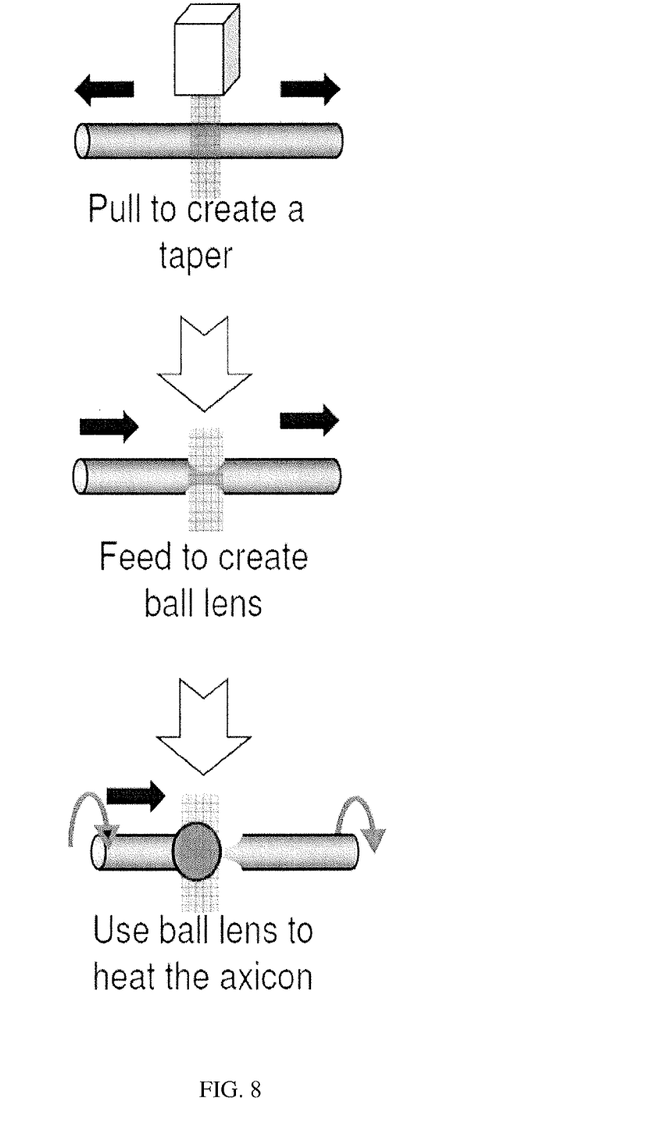
FIG. 8 illustrates processing steps for creating axicon lens using a fully automated splicer with CO2 laser beam for heating, according to another exemplary embodiment.

FIG. 8 illustrates processing steps for creating axicon lens using a fully automated splicer with CO2 laser beam for heating, according to another exemplary embodiment.

As shown in FIG. 8, the fiber is pulled to create a taper, followed by feeding to create the ball lens. The ball lens is then used to heat the axicon. The ball absorbs CO2 beam and radiates heat to heat the axicon tip.

Figure 9:
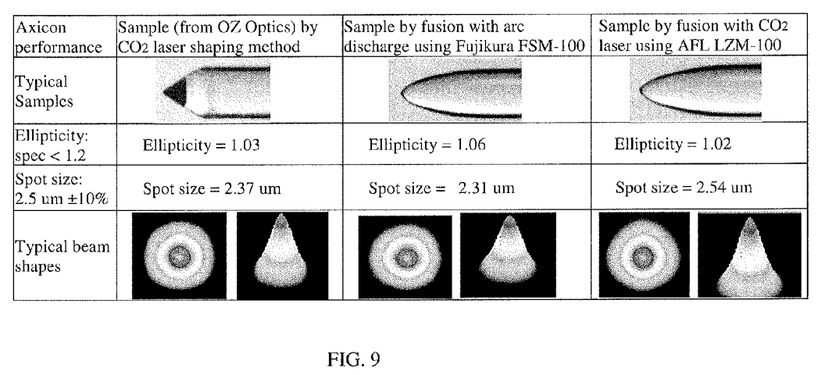
FIG. 9 illustrates a table comparing optical performance between samples created using the laser shaping technique and fusion technique.

FIG. 9 illustrates a table comparing optical performance between samples created using the laser shaping technique and fusion technique.

Axicon samples were made with PANDA fiber using different methods and were measured with a beam profiler at the 1550 nm wavelength, the results of which are depicted in the table illustrated in FIG. 9. Although the axicon lenses look different, the optical performance, as can be seen in the table, is almost identical.

Fused axicon fiber lenses can increase the coupling coefficient between the fiber and the chips for laser diodes and optoelectronic devices. Compared to the traditional shaping method, the fusion method yields similar results, but is less costly and easier to develop for large scale of production. In particular, utilizing a CO2 laser fusion splicing machine may result in a repeatable low-maintenance system for rapid, high-volume axicon lens production.

Although some benefits of manufacturing axicon fiber using the fusion techniques are listed above, the benefits are not limited thereto.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

The invention claimed is:

1. A method of manufacturing a fiber axicon taper, the method comprising:
    pulling a fiber to create a tapered neck;
    feeding the tapered neck to create a ball lens on a first side of the tapered neck; and
    heating a tip of the fiber on a second side of the tapered neck with heat radiating from the ball lens, thereby forming an axicon taper on the second side of the tapered neck.

* * * * *